US009382990B2

(12) United States Patent
Nolte et al.

(10) Patent No.: US 9,382,990 B2
(45) Date of Patent: Jul. 5, 2016

(54) HELICAL LIMITED SLIP DIFFERENTIAL

(71) Applicant: GM GLOBAL TECHNOLOGY OPERATIONS LLC, Detroit, MI (US)

(72) Inventors: Jason J. Nolte, Wixom, MI (US); David P. Schankin, Harrison Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/319,341

(22) Filed: Jun. 30, 2014

(65) Prior Publication Data

US 2015/0377335 A1    Dec. 31, 2015

(51) Int. Cl.
| | |
|---|---|
| *F16H 48/11* | (2012.01) |
| *F16H 48/38* | (2012.01) |
| *F16H 48/06* | (2006.01) |
| *F16H 55/22* | (2006.01) |
| *F16H 48/10* | (2012.01) |

(52) U.S. Cl.
CPC ............... *F16H 48/11* (2013.01); *F16H 48/06* (2013.01); *F16H 48/38* (2013.01); *F16H 55/22* (2013.01); *F16H 2048/106* (2013.01)

(58) Field of Classification Search
CPC ................................................. F16H 2055/086
See application file for complete search history.

(56) References Cited

U.S. PATENT DOCUMENTS

| | | | | |
|---|---|---|---|---|
| 3,375,736 | A  * | 4/1968  | Saari | 475/160 |
| 4,051,745 | A  * | 10/1977 | Ishikawa | 74/462 |
| 5,556,351 | A  * | 9/1996  | Hiraishi et al. | 475/160 |
| 5,624,344 | A  * | 4/1997  | Yehl et al. | 475/160 |
| 6,139,462 | A  * | 10/2000 | Gage et al. | 475/248 |
| 8,070,641 | B2 * | 12/2011 | McVea et al. | 475/249 |
| 8,167,757 | B2 * | 5/2012  | Ando et al. | 475/160 |
| 2004/0214683 | A1* | 10/2004 | Yoshiyama et al. | 475/344 |
| 2005/0057097 | A1* | 3/2005  | Wu et al. | 305/194 |
| 2010/0144484 | A1* | 6/2010  | Bawks | 475/226 |

* cited by examiner

*Primary Examiner* — Justin Holmes
*Assistant Examiner* — David Morris
(74) *Attorney, Agent, or Firm* — Quinn Law Group, PLLC

(57) ABSTRACT

A helical LSD includes a case defining an inner cavity and a plurality of grooves disposed around the inner cavity. In addition to the case, the helical LSD includes a plurality of pinion gears. Each pinion gear is disposed in one of the grooves and includes a plurality of gear teeth. Each gear tooth has a top land. The helical LSD further includes at least one helical output gear disposed in the inner cavity of the case. The helical output gear meshes with the pinion gears, and the pinion gears are disposed around the helical output gear. The top land has a surface profile characterized by raised portions and indentations in order to minimize noise and vibration when the pinion gears rotate relative to the case. The surface profile can also be applied to contact surfaces of power transfer units and transfer cases.

15 Claims, 5 Drawing Sheets

HELICAL LIMITED SLIP DIFFERENTIAL

TECHNICAL FIELD

The present disclosure relates to a helical limited slip differential.

BACKGROUND

Vehicles typically include a differential to appropriately distribute power to its wheels. In particular, the differential enables the outer driven wheel to rotate faster than the inner driven wheel during a turn. The limited slip differential (LSD) is a kind of differential that limits the speed difference or "slip" between the left and right driven wheels. The helical LSD includes a plurality of helical gears.

SUMMARY

Helical LSDs include several moving parts, such as helical gears. These parts move relative to each other and generate friction at several contact surfaces. The friction at these contact surfaces may cause noise and vibration. It is useful to minimize the noise and vibration in the helical LSD. Accordingly, the presently disclosed helical LSD includes contact surfaces that have a surface profile characterized by raised portions and indentations in order to minimize the noise and vibration. In the present disclosure, the term "surface profile" refers to local deviations of a surface from a perfectly flat plane or smooth curved surface in the form of raised portions and indentations. The profiled contact surfaces are not formed using surface finishing processes, such as sandblasting. Rather, the profiled contact surfaces of the helical LSD can be formed using metal forming processes, such as rolling.

In an embodiment, the helical LSD includes a case defining an inner cavity and a plurality of grooves disposed around the inner cavity. In addition to the case, the helical LSD includes a plurality of pinion gears. Each pinion gear is disposed in one of the grooves and includes a plurality of gear teeth. Each gear tooth has a top land. The helical LSD further includes at least one helical output gear disposed in the inner cavity of the case. The case defines a first case end and a second case end opposite the first case end. The helical LSD includes a first cap coupled to the first case end and a second cap coupled to the second case end. Each of the first and second caps defines an inner cap surface facing the helical output gear. The helical output gear meshes with the pinion gears, and the pinion gears are disposed around the helical output gear. The top land has a surface profile characterized by raised portions and indentations in order to minimize noise and vibration when the pinion gears rotate relative to the case.

In another embodiment, each inner cap surface has a surface profile characterized by raised portions and indentations so as to minimize noise and vibration when the pinion gears rotate relative to the case. The present disclosure also relates to a vehicle including the helical LSDs described above.

The above features and advantages and other features and advantages of the present teachings are readily apparent from the following detailed description of the best modes for carrying out the teachings when taken in connection with the accompanying drawings.

DETAILED DESCRIPTION

Figure 1:
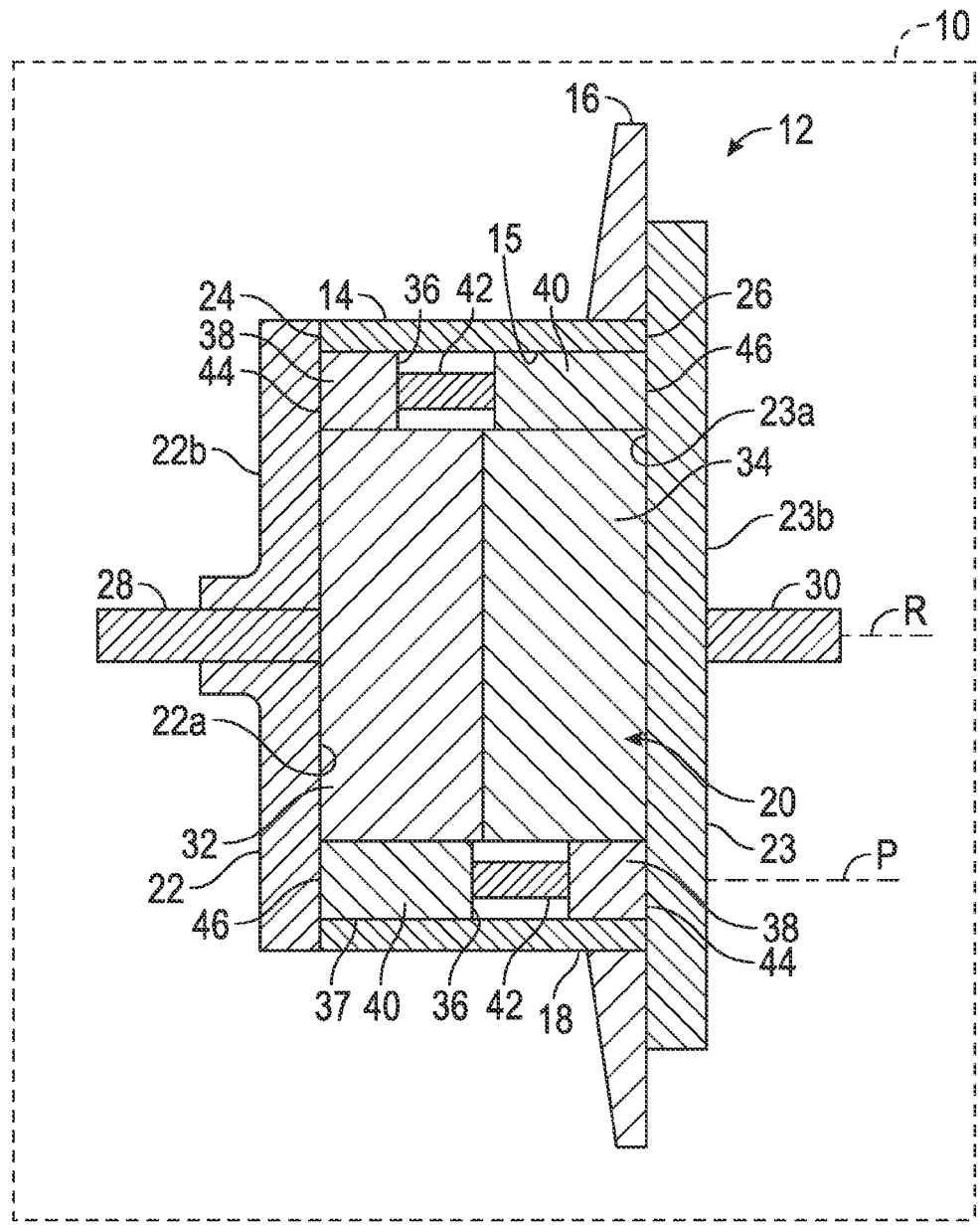
FIG. 1 is a schematic cross-sectional side view of a helical LSD in accordance with an embodiment of the present disclosure.
Figure 2:
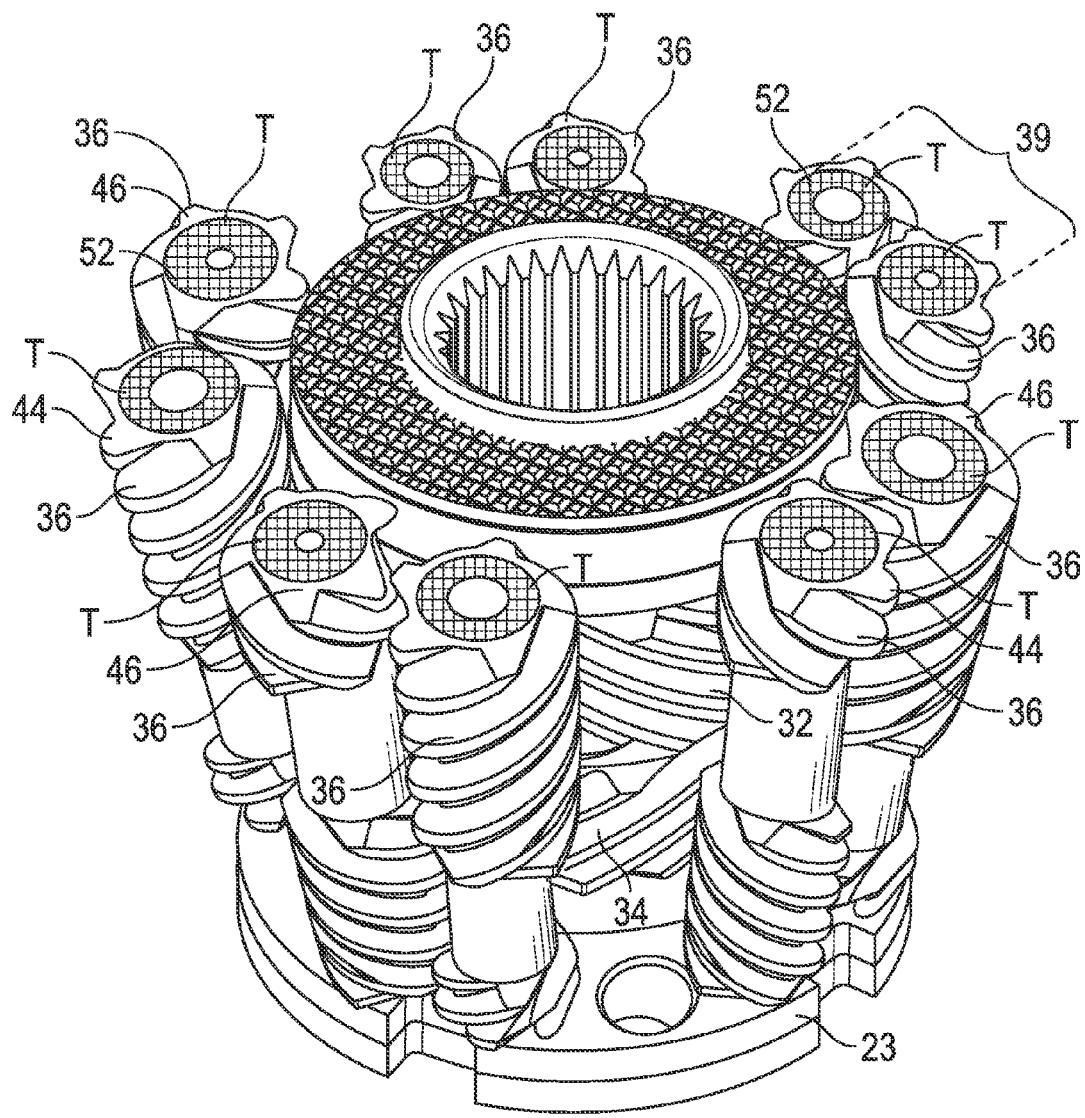
FIG. 2 is a schematic perspective view of the helical LSD of FIG. 1, without the case and one of the caps.

Referring now to the drawings, wherein the like numerals indicate corresponding parts throughout the several views, FIGS. 1 and 2 schematically illustrate an example of a helical limited slip differential (LSD) 12, which is part of a vehicle 10. The vehicle 10 may be a land vehicle, such as a car or truck. The helical LSD 12 is wholly or partly made of a metallic material and includes a hollow case 14 and a ring gear 16 fixed to an outer surface 18 of the case 14. In operation, the power output of the vehicle transmission (not shown) can rotate the ring gear 16 (along with the case 14) about a rotation axis R. The case 14 defines a central inner cavity 20 configured, shaped, and sized to retain various internal components of the helical LSD 12 as discussed in detail below. The helical LSD 12 additionally includes a first cap 22 and a second cap 23 coupled to the case 14, thereby aiding in retaining the internal components of the helical LSD 12 inside the case 14. The first cap 22 is coupled to a first case end 24 of the case 14, and the second cap 23 is coupled to a second case end 26 opposite the first case end 24. Therefore, the first cap 22 and the second cap 23 are coupled to opposite ends of the case 14. Each of the first cap 22 and the second cap 23 defines an inner cap surface 22a, 23a and an outer cap surface 22b, 23b opposite to the respective inner cap surface 22a, 23a. A first drive shaft 28 extends through the first cap 22 and a second drive shaft 30 extends through the second cap 23 along the rotation axis R. Although FIG. 1 shows two caps (i.e., the first cap 22 and second cap 23), the helical LSD 12 may include only one cap.

With reference to FIGS. 1 and 2, the helical LSD 12 includes a first helical output gear 32 rotatably coupled to the first drive shaft 28 and a second helical output gear 34 rotatably coupled to the second drive shaft 30. The first helical output gear 32 and the second helical output gear 34 are entirely disposed in the inner cavity 20 of the case 14. In particular, the first cap 22 and the second cap 23 retain the first helical output gear 32 and the second helical output gear 34 within the case 14 such that the inner cap surfaces 22a, 23a face the first and second helical output gears 32, 34. During operation of the helical LSD 12, the first helical output gear 32 and the second helical output gear 34 can rotate about the rotation axis R. Because the first helical output gear 32 is rotatably coupled to the first drive shaft 28, rotating the first helical output gear 32 causes the first drive shaft 28 to rotate about the rotation axis R. Furthermore, because the second helical output gear 34 is rotatably coupled to the second drive shaft 30, rotating the second helical output gear 34 causes the second drive shaft 30 to rotate about the rotation axis R.

The helical LSD 12 additionally includes a plurality of helical pinion gears 36 meshed with the first helical output gear 32 and the second helical output gear 34. In the depicted embodiment, the pinion gears 36 are arranged in meshing pairs 39 around (FIG. 5) the first helical output gear 32 and the second helical output gear 34. The helical pinion gears 36 defining one meshing pair 39 are meshed with each other and with the first helical output gear 32 and the second helical output gear 34.

Each pinion gear 36 extends along a pinion axis P and can rotate around the first helical output gear 32 and the second helical output gear 34. In addition, each pinion gear 36 can rotate about the pinion axis P. During operation of the helical LSD 12, rotating the case 14 about the rotation axis R causes the pinion gears 36 to rotate around the first helical output gear 32 and the second helical output gear 34. While rotating around the first helical output gear 32 and the second helical output gear 34 about the rotation axis R, each pinion gear 36 also rotates about its respective pinion axis P. Although the drawings illustrate only one pinion axis P, each pinion gear 36 defines its own pinion axis.

Each pinion gear 36 includes a first geared portion 38, a second geared portion 40, and a central pinion shaft 42 interconnecting the first geared portion 38 and the second geared portion 40. The central pinion shaft 42 could be geared or non-geared. The second geared portion 40 is longer than the first geared portion 38. However, the first geared portion 38 and the second geared portion 40 may have the same length. Each of the first geared portion 38 and the second geared portion 40 meshes with one of the first helical output gear 32 and the second helical output gear 34. Accordingly, each of the first geared portion 38 and the second geared portion 40 includes a plurality of gear teeth 41. Each gear tooth 41 has a top land 43. In the present disclosure, the term "top land" refers to the surface at the top of the gear tooth 41.

As discussed above, the pinion gears 36 are arranged in meshing pairs 39 around (FIG. 5) the first helical output gear 32 and the second helical output gear 34. Each meshing pair 39 includes two pinion gears 36 oriented in opposite directions. Thus, in each meshing pair 39, the first geared portion 38 of one pinion gear 36 meshes with the second geared portion 40 of the other pinion gear 36. Furthermore, each pinion gear 36 defines a first end surface 44 and a second end surface 46 opposite the first end surface 44. Because the pinion gears 36 may have different orientations relative to the case 14, the first end surfaces 44 of some pinion gears 36 contact inner cap surface 22a of the first cap 22, while the first end surfaces 44 of other pinion gears 36 contact the inner cap surface 23a of the second cap 23. Moreover, the second end surfaces 46 of some pinion gears 36 contact the second cap 23 of the case 14, while other second end surfaces 46 of other pinion gears 36 contact the first cap 22. Accordingly, the inner cap surfaces 22a, 23a, the first end surfaces 44 of the pinion gears 36, and the second end surfaces 46 of the pinion gears 36 are considered contact surfaces.

Figure 10:
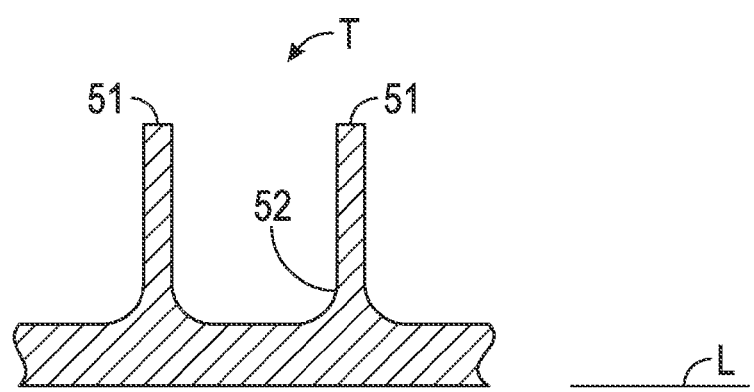
FIG. 10 is a schematic cross-sectional side view of a surface profile for the contact surfaces of the helical LSD.

The case 14 defines a case contact surface 15, and each of the first helical output gear 32, the second helical output gear 34, and the pinion gears 36 defines a gear contact surface 37. The gear contact surfaces 37 face the case contact surfaces 15. Further, the gear contact surfaces 37 may contact the case contact surfaces 15. When the helical gears rotate (e.g., the first helical output gear 32, the second helical output gear 34, and/or the pinion gears 36) relative to the case 14, the contact between the gear contact surfaces 37 and the case contact surfaces 15 generate friction. This friction may cause noise, vibration, and harshness. To minimize the noise, vibration, and harshness, the gear contact surfaces 37 and/or the case contact surfaces 15 defines the surface profile T characterized by raised portions 51 (FIG. 10) and indentations 52 (FIG. 10).

Figure 3:
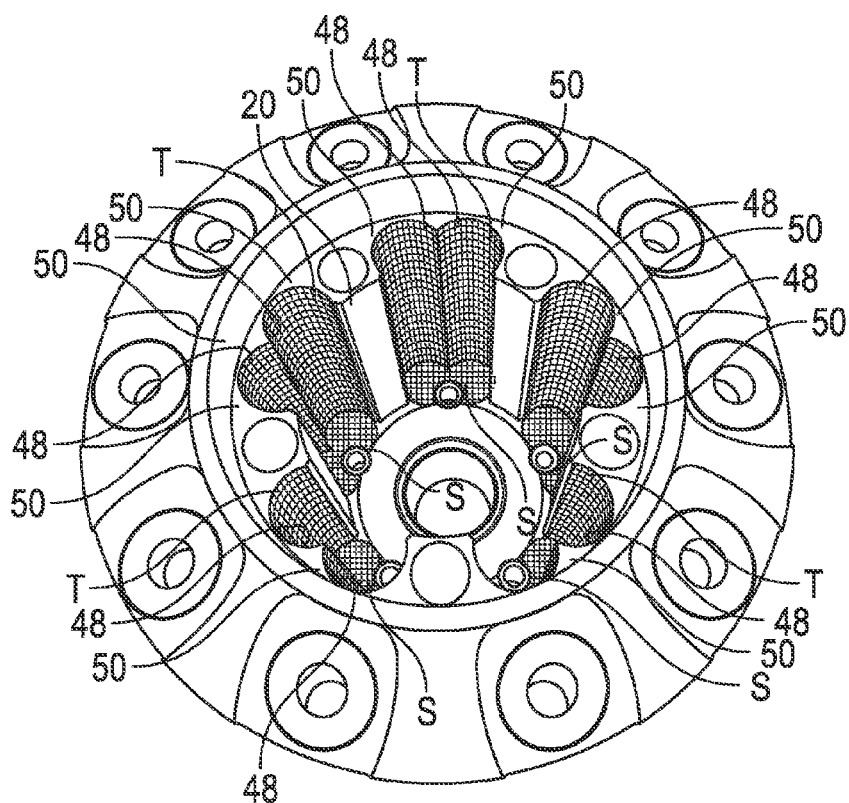
FIG. 3 is a schematic perspective view of the case of the helical LSD of FIG. 1.

With reference to FIG. 3, the case 14 further defines a plurality of grooves 48 each configured, shaped, and sized to receive one pinion gear 36. In the depicted embodiment, the grooves 48 are arranged in pairs around the inner cavity 20. Accordingly, the inner cavity 20 is in communication with all the grooves 48. The case 14 includes inner lateral surfaces 50 each defining one groove 48. Each inner lateral surface 50 has a substantially concave shape in order to receive the pinion gear 36. During operation of the helical LSD 12, each pinion gear 36 rotates about its respective pinion axis P (FIG. 1) within one of the grooves 48. Accordingly, the top lands 43 of each pinion gear 36 may contact the inner lateral surface 50 defining one of the grooves 48. Therefore, the top lands 43 of the pinion gears 36 and the inner lateral surfaces 50 defining the grooves 48 are deemed contact surfaces.

During the operation of the helical LSD 12, a number of contact surfaces are subjected to friction. For instance, as discussed above, the top lands 43 of the gear teeth 41 contact the inner lateral surfaces 50 of the case 14 when the pinion gears 36 rotate, thereby generating friction. Moreover, the first and second end surfaces 44, 46 of the pinion gears 36 contact the first and second caps 22, 23 when the pinion gears 36 rotate, thereby generating friction. The friction between the contact surfaces of the helical LSD 12 can in turn generate noise, vibration, and harshness. In order to provide a smooth, quiet ride for the vehicle occupant, it is useful to minimize the noise, vibration, and harshness in the helical LSD 12. To do so, certain contact surfaces of the helical LSD 12 are profiled so as to minimize the noise, vibration, and harshness. As used herein, the term "profiled" refers to local deviations of a surface from a perfectly flat plane or continuously smooth curved surface or contoured. In the present disclosure, the "profiled contact surfaces" are not necessarily formed using surface finishing processes, such as sandblasting. Rather, the profiled contact surfaces of the helical LSD 12 can be formed using metal forming processes, such as rolling. Because all the components of the helical LSD 12 are made of metallic material, metal forming processes can be used to form a surface profile T in the appropriate contact surfaces, such as the first and second end surfaces 44, 46. In the present disclosure, the surface profile T is characterized by raised portions 51 (FIG. 10) and indentations 52 (FIG. 10). As shown in FIG. 10, the raised portions 51 and indentations 52 are defined with respect to a plane L. Although the present disclosure focuses on the helical LSD 12, the surface profile T can be applied to contact surfaces of other torque transmitting devices such as power transfer units (PTUs) and transfer cases. Further, in the present disclosure, the surface profile T is applied to specific surfaces. However, the surface profile T may be applied to any contact surface of the helical LSD 12 that is subjected to friction.

The noise and vibration disturbance created by the helical LSD 12 occurs when the stick-slip phenomenon occurs between the mating surfaces of the pinion gears 36 and the case 14 under differentiation. The surface profile T in contact surfaces between the helical output gear (e.g., the first helical output gear 32 and the second helical output gear 34) and the case 14 reduces propensity for stick-slip phenomena by creating tuning options through (1) breaks in surface contact between mating surfaces during differentiation, (2) paths for lubrication flow alternatives and (3) mating interface stiffness. The surface profile T in contact surfaces of the pinion gear 36 and the case 14 can be applied to either side of the gear-end areas identified in FIGS. 2, 3, and 4. Further, the surface profile T can be applied to either side of the gear top land to case interface, identified in FIGS. 3 and 5.

Figure 6:
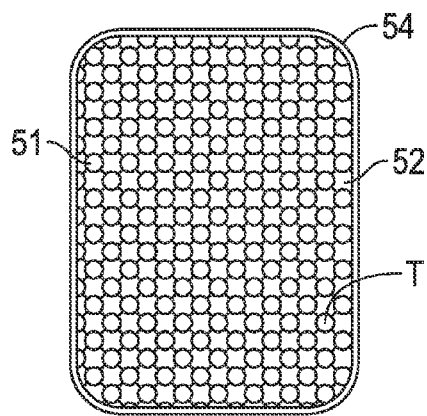
FIG. 6 is a schematic illustration of a surface profile for contact surfaces of the helical LSD.
Figure 7:
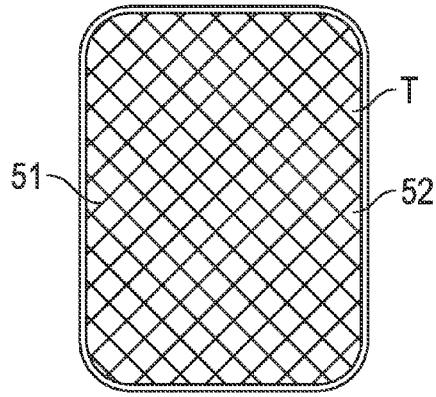
FIG. 7 is a schematic illustration of another example of a surface profile for contact surfaces of the helical LSD.
Figure 8:
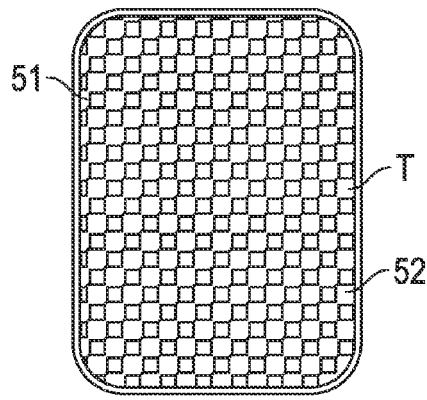
FIG. 8 is a schematic illustration of yet another surface profile for the contact surfaces of the helical LSD.

With reference again to FIG. 2, as discussed above, the first and second end surfaces 44, 46 of the pinion gears 36 contact the first and second caps 22, 23. In order to minimize noise, vibration, and harshness, the first and second end surfaces 44, 46 of the pinion gears 36 have a surface profile T. In other words, the first and second end surfaces 44, 46 are profiled. The surface profile T in the first and second end surfaces 44, 46 are characterized by raised portions 51 (FIG. 10) and indentations 52 (FIG. 10) and can be symmetrical. Therefore, the surface profile T can define a geometric pattern, such as a cross-hatched pattern. To form the cross-hatch pattern, for instance, the first and second end surfaces 44, 46 include a plurality of raised portions 51 (FIG. 10) and indentations 52 (FIG. 10) arranged in rows and columns. The cross-hatch pattern may be like a waffle pattern. As non-limiting examples, the indentations 52 have a diamond shape (FIG. 7) or a square shape (FIG. 8). The raised portions 51 may define diamond-shaped hollow structures (FIG. 7) or square-shaped hollow structures (FIG. 8). Alternatively, the raised portions 51 can be circumferential protrusions 54 (FIG. 6). The circumferential protrusions 54 may be circular. The circumferential protrusions 54 may be applied to any of the contact surfaces (e.g., as the inner lateral surfaces 50, the top lands 43, the inner cap surfaces 22a, 23a, and/or the first and second end surfaces 44, 46) described in the present disclosure. The inner lateral surfaces 50 and the inner cap surfaces 22a, 23a are case contact surfaces 15. The top lands 43 and the first and second end surfaces 44, 46 are gear contact surfaces 37. However, it is also contemplated that the surface profile T in the first and second end surfaces 44, 46 may be random. Irrespective of the specific shape, the surface profile T is configured, shaped, and sized to minimize the noise, vibration, and harshness caused by the friction between the first and second end surfaces 44, 46 and the first and second caps 22, 23. The surface profile T may be in only one of the first and second end surfaces 44, 46 of the pinion gears 36. Further, the surface profile T may be only in some pinion gears 36.

Figure 4:
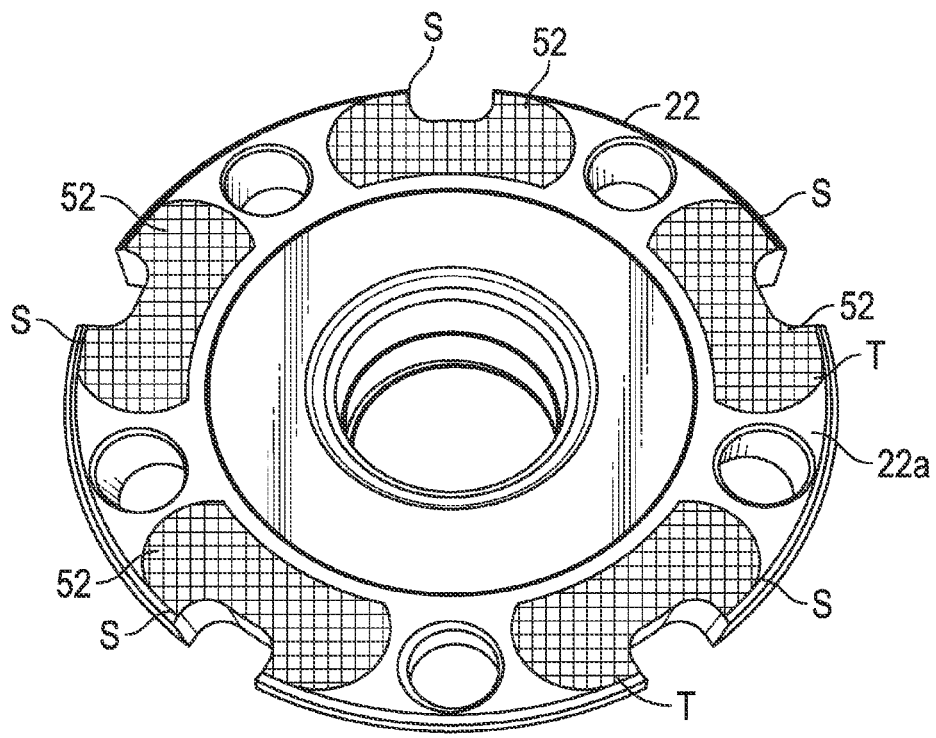
FIG. 4 is a schematic perspective view of the cover of the helical LSD of FIG. 1.

As shown in FIG. 4, the inner cap surfaces 22a, 23a of the first and second caps 22, 23 have a surface profile T to minimize the noise, vibration, and harshness caused by the friction between the first and second caps 22, 23 and the pinion gears 36. In other words, the inner cap surfaces 22a, 23a may be profiled so as to minimize noise, vibration, and harshness during the operation of the helical LSD 12. The surface profile T in the inner cap surfaces 22a, 23a may be formed by indentations 52 symmetrically arranged in rows and columns as discussed above with respect to the first and second end surfaces 44, 46. As non-limiting examples, the indentations 52 in the inner cap surfaces 22a, 23a have a diamond shape (FIG. 7) or a square shape (FIG. 8). Alternatively or additionally, the surface profile T in the inner cap surfaces 22a, 23a may be defined by circumferential protrusions 54 (FIG. 6). Only the sections S of the inner cap surfaces 22a, 23a that contact the pinion gears 36 may be profiled as shown in FIG. 4. The remaining portions of the inner cap surfaces 22a, 23a (i.e., outside the section S) may be substantially flat. Although FIG. 4 only shows the first cap 22, the inner cap surface 23a of the second cap 23 may also be profiled.

Figure 5:
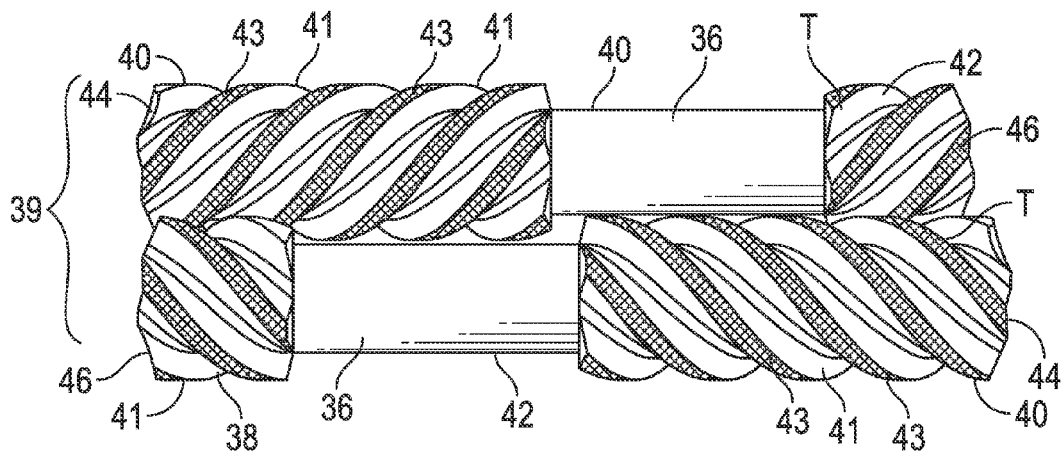
FIG. 5 is a schematic top view of a pair of pinion gears of the helical LSD of FIG. 1.

With reference to FIGS. 3 and 5, as discussed above, the top lands 43 of the gear teeth 41 contact the inner lateral surfaces 50 defining the grooves 48, thereby generating friction. This friction can in turn produce noise, vibration, and harshness. To minimize the noise, vibration, and harshness, the top lands 43 of the gear teeth 41 can be profiled. In other words, the top lands 43 of the gear teeth 41 have a surface profile T. As non-limiting examples, the surface profile T in the top lands 43 of the gear teeth 41 may be symmetrical as shown in FIGS. 6, 7, and 8. Specifically, the surface profile T in the top lands 43 include raised portions 51 and indentations 52 arranged in rows and columns that define squares (FIG. 8) or diamonds (FIG. 7). Alternatively or additionally, the raised portions 51 in the top lands 43 are circumferential protrusions 54 (FIG. 6). The surface profile T in the top lands 43 may have a random arrangement instead of symmetrical geometric pattern. Regardless, the surface profile T in the top lands 43 is configured, shaped, and sized to minimize the noise, vibration, and harshness caused by the friction between the inner lateral surfaces 50 and the gear teeth 41 of the pinion gears 36.

With continued reference to FIGS. 3 and 5, the inner lateral surfaces 50, which define the grooves 48, can also be profiled in order to minimize noise, vibration, and harshness caused by the friction between the inner lateral surfaces 50 and the gear teeth 41 of the pinion gears 36. In other words, the inner lateral surfaces 50 have a surface profile T. The surface profile T in the inner lateral surfaces 50 can be defined by raised portions 51 and indentations 52 as shown in FIGS. 6, 7, and 8. In addition to the inner lateral surfaces 50, the end of the grooves 48 may also have the surface profile T. In FIG. 3, the section S may represent the inner surface 22a or 23a of the cap 22 or 23b. Alternatively, the section S in FIG. 3 may represent the inner surface of the case 14 that defines the end of the grooves 48. The end of the grooves 48 are defined by the case 14 if the helical LSD 12 includes only one cap 22. The surface profile T in the end of the grooves 48 can be defined by raised portions 51 and indentations 52 as shown in FIGS. 6, 7, and 8. For instance, the surface profile T in the end of the grooves 48 can include the circumferential protrusions 54 shown in FIG. 6.

Figure 9:
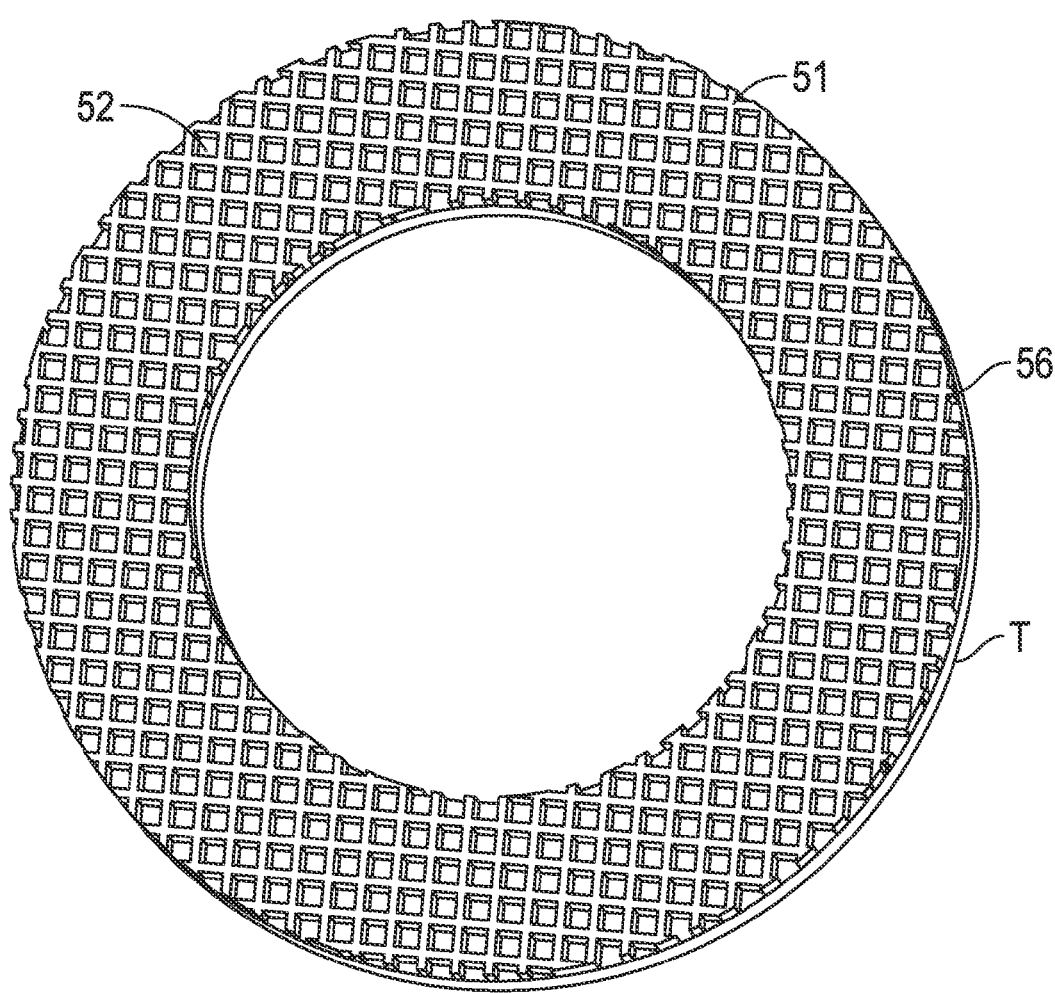
FIG. 9 is a schematic top view of a discrete profiled layer for placement between contact surfaces of the helical LSD.

With reference to FIG. 9, a discrete profiled layer 56 may also be placed between the contact surfaces of the helical LSD 12 (e.g., as the inner lateral surfaces 50, the top lands 43, the inner cap surfaces 22a, 23a, and the first and second end surfaces 44, 46) in order to minimize noise, vibration, and harshness. Specifically, the discrete profiled layers 56 may be disposed between the inner cap surfaces 22a, 22a, and the first and second end surfaces 44, 46 and between the inner lateral surfaces 50 and the top lands 43 of the gear teeth 41. Although the drawings show a profiled layer 56 with a substantially annular shape, the discrete profiled layer 56 may be other suitable shapes. The discrete profiled layer 56 also has a surface profile T characterized by raised portions 51 and indentations 52, which may be arranged in a geometric patterns as shown in FIGS. 6, 7, and 8 or in a random manner. Moreover, the discrete profiled layer 56 may be shaped as a washer or any other apparatus suitable to sustain a load.

While the best modes for carrying out the teachings have been described in detail, those familiar with the art to which this disclosure relates will recognize various alternative designs and embodiments for practicing the teachings within the scope of the appended claims.

The invention claimed is:
1. A helical limited slip differential, comprising:
   a case defining an inner cavity and a plurality of grooves disposed around the inner cavity, wherein the case defines a first case end and a second case end opposite to the first case end;
   a plurality of pinion gears, wherein each of the pinion gears is disposed in one of the grooves, each of the plurality of pinion gears includes a plurality of gear teeth, each of the pinion gears has a first end surface and a second end surface opposite the first end surface, and each of the gear teeth has a top land;

at least one helical output gear disposed in the inner cavity, wherein the at least one helical output gear meshes with the pinion gears, and the pinion gears are disposed around the at least one helical output gear;

a cap coupled to the first case end, wherein the cap defines an inner cap surface, the inner cap surface faces the at least one helical output gear, the first end surface of each of the pinion gears faces the inner cap surface, the inner cap surface has a surface profile, the surface profile is characterized by raised portions and indentations, and the raised portions are circular protrusions; and wherein the top land of each of the gear teeth has the surface profile.

2. The helical limited slip differential of claim 1, wherein the case has a plurality of inner lateral surfaces, each of the inner lateral surfaces defines one of the grooves, and the inner lateral surfaces has the surface profile so as to minimize noise and vibration when the pinion gears rotate relative to the case.

3. The helical limited slip differential of claim 2, wherein the raised portions and indentations of the surface profile are symmetrically arranged in rows.

4. The helical limited slip differential of claim 3, wherein the indentations have a diamond shape.

5. The helical limited slip differential of claim 3, wherein the indentations have a square shape.

6. The helical limited slip differential of claim 1, wherein each of the plurality of grooves has an end defined by the case, and the end of the groove has the surface profile.

7. The helical limited slip differential of claim 1, wherein the first and second end surfaces contact first and second caps, and the first and second end surfaces define the surface profile so as to minimize noise and vibration when the pinion gears rotate relative to the case.

8. The helical limited slip differential of claim 1, wherein the cap is a first cap, the helical limited slip differential includes a second cap coupled to the second case end, the inner cap surface is a first inner cap surface, the second cap includes a second inner cap surface, and the helical limited slip differential further includes a discrete profiled layer between the first inner cap surface and the first end surface of at least one of the pinion gears, and the discrete profiled layer has an annular shape.

9. A helical limited slip differential, comprising:

a case defining an inner cavity and a plurality of grooves disposed around the inner cavity, wherein the case defines a first case end and a second case end opposite the first case end;

a plurality of pinion gears, wherein each of the pinion gears is disposed in one of the grooves, and each of the pinion gears has a first end surface and a second end surface opposite the first end surface;

at least one helical output gear disposed in the inner cavity, wherein the at least one helical output gear meshes with the pinion gears, and the pinion gears are disposed around the at least one helical output gear;

a cap coupled to the first case end; and wherein the cap defines an inner cap surface facing the at least one helical output gear, and the inner cap surface has a surface profile, the surface profile is characterized by raised portions and indentations, the raised portions are circular protrusions, and the first end surface of each of the pinion gears faces the inner cap surface.

10. The helical limited slip differential of claim 9, wherein the raised portions are arranged symmetrically so as to define a geometric pattern.

11. The helical limited slip differential of claim 9, wherein the indentations have a square shape.

12. The helical limited slip differential of claim 9, wherein the case has a plurality of inner lateral surfaces, each of the inner lateral surfaces defines one of the grooves, and the inner lateral surfaces has the surface profile so as to minimize noise and vibration when the pinion gears rotate relative to the case.

13. The helical limited slip differential of claim 9, wherein the first and second end surfaces contact the cap, and the first and second end surfaces have the surface profile so as to minimize noise and vibration when the pinion gears rotate relative to the case.

14. The helical limited slip differential of claim 13, wherein the first end surface of at least one of the pinion gears directly contacts the inner cap surface.

15. A vehicle, comprising:

a case defining a case contact surface;

at least one helical output gear disposed within the case, wherein the at least one helical output gear defines a gear contact surface, and the gear contact surface faces the case contact surface; and at least one pinion gear disposed within the case, the at least one pinion gear has a first end surface and a second end surface opposite the first end surface; and a cap coupled to the case, wherein the cap has an inner cap surface, the inner cap surface faces the at least one helical output gear, the inner cap surface has at least one section, the first end surface of the at least one pinion gear contacts the inner cap surfaces only at the at least one section, and only the at least one section of the inner cap surface has a surface profile characterized by raised portions and indentations, and the raised portions are circular protrusions.

* * * * *